United States Patent

Bailey et al.

[11] 3,946,491
[45] Mar. 30, 1976

[54] PNEUMATIC ENGRAVING TOOL

[75] Inventors: Russell O. Bailey, Sarasota; William S. Stone, Longboat Key, both of Fla.

[73] Assignee: S-P Products, Inc., Sarasota, Fla.

[22] Filed: Oct. 9, 1974

[21] Appl. No.: 513,504

[52] U.S. Cl. .................................. 33/23 R; 415/503
[51] Int. Cl.² ......................................... B43L 13/10
[58] Field of Search ...... 33/18 R, 23 D, 23 R, 25 R; 32/27; 415/119, 123, 503

[56] References Cited
UNITED STATES PATENTS

| | | | |
|---|---|---|---|
| 3,073,114 | 1/1963 | Wood | 415/123 X |
| 3,218,028 | 11/1965 | Borden | 415/503 X |
| 3,221,500 | 12/1965 | Hill | 415/119 X |
| 3,250,008 | 5/1966 | Heisley | 33/23 D |
| 3,324,553 | 6/1967 | Borden | 415/503 X |
| 3,381,378 | 5/1968 | Lawrence et al. | 415/503 X |
| 3,417,963 | 12/1968 | Maverna | 415/503 X |

*Primary Examiner*—Richard E. Aegerter
*Assistant Examiner*—Charles E. Phillips
*Attorney, Agent, or Firm*—Clarence A. O'Brien; Harvey B. Jacobson

[57] ABSTRACT

A fluid actuated, portable engraving tool has a body provided with an opening into which a unitized fluid motor assembly is arrangeable. The body has a tracing assembly mounted on it for engaging in a suitable template, and the like, and guiding a cutter associated with the motor assembly along a path determined by the template. A preferred motor assembly includes a motor cap, fluted rotor, and two bearings affixed to a spindle. Fitting of the bearings into the body opening mounts the motor assembly on the body.

3 Claims, 4 Drawing Figures

U.S. Patent  March 30, 1976  3,946,491
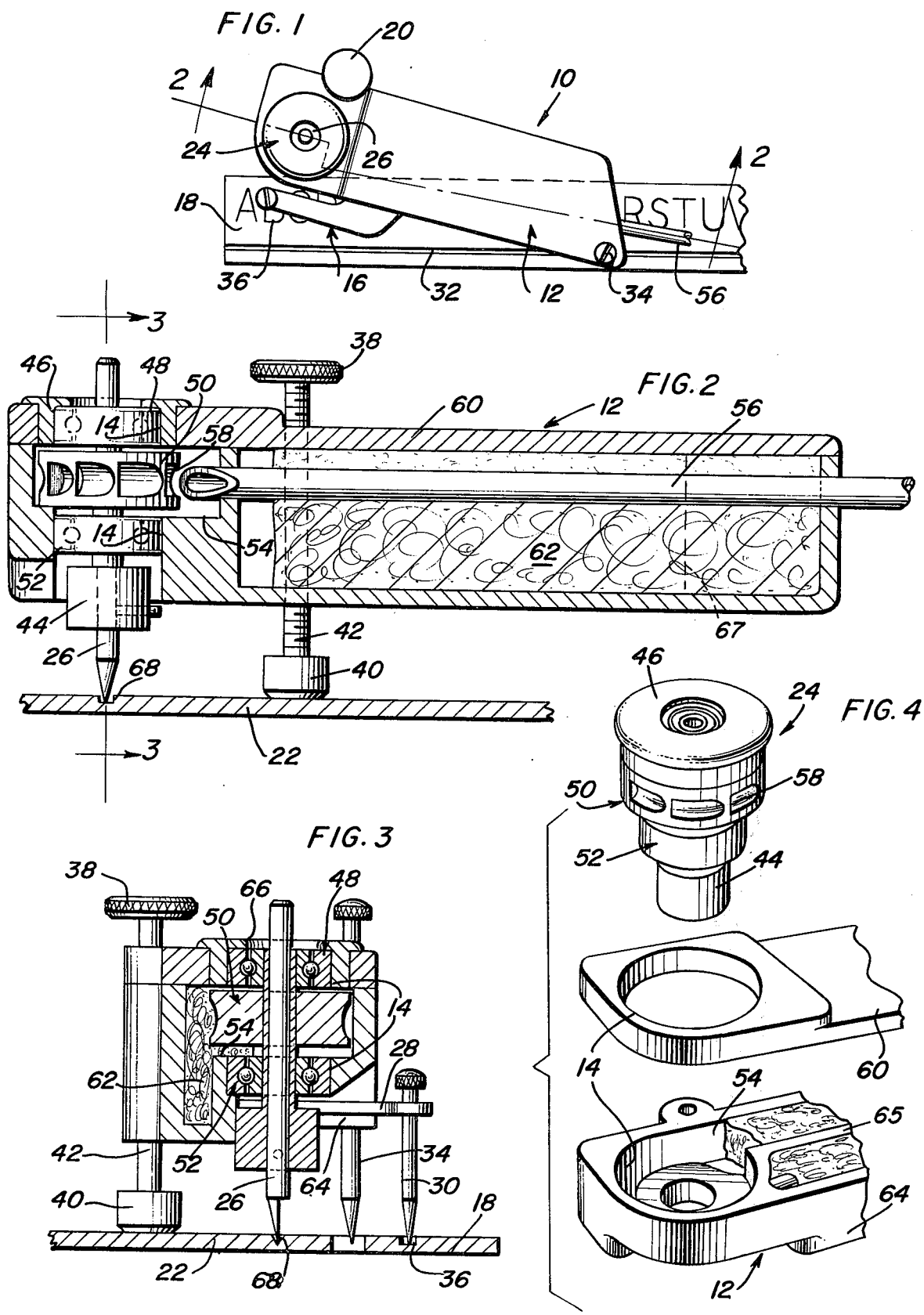

PNEUMATIC ENGRAVING TOOL

BACKGROUND OF THE INVENTION

1. Field of the Invention

This invention relates generally to engraving machines, and particularly to a manually operated portable machine of superior performance, improved significantly over prior art devices by the inclusion of a unitized pneumatic motor within the body of the engraving machine.

2. Description of the Prior Art

Considerable difficulty has been encountered in the past in driving a cutter of an engraving tool at speeds sufficiently great to provide smooth chatter-free engraving within a portable machine.

Electric powered devices either direct coupled or belt driven by an electric motor, and the like, are necessarily heavy and difficult to handle from the standpoint of true portability of a manual device. Further, counter-weighted or counter-balanced mechanisms tend to encumber the operator and thereby defeat the true object of portability.

Further problems encountered in the past by conventional manually operated engraving machines involve vibration and heat. Belt driven spindles tend to vibrate when reaching speeds in excess of 20,000 rpm. Bearing friction within the spindles also tends to raise the temperature to damaging levels when rotated at speeds in excess of 20,000 rpm, thereby reducing the life expectancy of a unit to that of impracticality.

Still another and very significant problem encountered in the past with portable engravers is that of heavy, cumbersome, and tiring manipulation by even the most skilled and manually dexterous of operators due to the massiveness of the machines.

Prior patents believed to be pertinent to this invention are as follows:

| | |
|---|---|
| 2,185,011 | Dec. 26, 1939 |
| 2,780,966 | Feb. 12, 1957 |
| 2,884,695 | May 5, 1959 |
| 3,250,008 | May 10, 1966 |

SUMMARY OF THE INVENTION

It is an object of the present invention to provide a portable engraving machine capable of operating successfully at speeds between 20,000 and 50,000 rpm, or more, in a vibrationless and cool running mode.

It is a further object of the present invention to provide an engraving machine that does not require counter-balanced weights, levers, or appendages for compensating the mass of power unit such as an electric motor, an arrangement of linkages, and the like.

It is still another object of the present invention to provide an engraving machine that has a self-contained unitized pneumatic driven spindle lubricated by a unique lubrication system that forms an assembly capable of operating continually at speeds desired without suffering bearing damage due to heat and friction.

Yet another object of the present invention is to provide an engraving machine that incorporates a unitized motor spindle combination with only one moving part, other than the bearings, and that may readily be removed and replaced should a bearing failure occur.

A further object of this invention is to provide a truly portable engraving machine that is small enough to rest comfortably in the palm of the hand and weighs less than six ounces, yet produces sufficient power to engrave with a superb fineness of detail in wood, plastic, metal, and the like.

Yet another object of this invention is to provide a pneumatic driven engraving machine that is dynamically designed in such a manner as to produce 40,000 rpm spindle speeds at 20 psig while consuming less than two cubic feet of fluid under pressure thereby requiring the very minimum in a compressed gas supply.

These and other objects are achieved according to the present invention by providing a fluid actuated, portable engraving tool having: a body provided with an opening; a tracing assembly mounted on the body and arranged for engaging in a suitable template; and a unitized fluid motor assembly arrangeable in the opening of the body.

According to a preferred form of the invention, the motor assembly includes a combination of a fluid motor and a spindle, with the combination comprising a motor cap, a fluted rotor, and a pair of bearings affixed to the spindle. The bearings advantageously are arranged bracketing the rotor in cooperation with the motor cap. A cavity is provided in the body and arranged in communication with the opening of the body for forming a chamber which receives the rotor. A tube enters the body and terminates at an interface between the rotor and the chamber for receiving the rotor. By this arrangement, the tube provides a passage for injecting a fluid under pressure and impinging same on a fluted circumference of the rotor for rotating same. The motor and spindle combination is mounted in the opening of the body by a press fit of the bearings which form the unitized motor assembly.

The body advantageously includes a removable cover, part of the opening of the body being formed in the cover. The bearing associated with the motor cap is thus press fit into the part of the opening provided in the cover.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, top plan view, showing an engraving tool according to the present invention arranged with a suitable template.

FIG. 2 is a fragmentary, sectional view taken generally along the line 2—2 of FIG. 1.

FIG. 3 is a fragmentary, sectional view taken generally along the line 3—3 of FIG. 2.

FIG. 4 is a fragmentary, exploded, perspective view showing a unitized motor assembly according to the present invention and those parts of the body of the engraving tool into which the motor is inserted.

DESCRIPTION OF THE PREFERRED EMBODIMENT

Referring now more particularly to FIGS. 1–3 of the drawings, an engraving tool 10 according to the present invention has a body 12 provided with an opening 14 (See FIGS. 2 and 3 of the drawings). A tracing assembly 16 is mounted on body 12 and arranged for engaging in a suitable template 18, while a height adjustment assembly 20 cooperates with a workpiece 22 (See FIGS. 2 and 3 of the drawings) to adjust the depth of a cut made in the workpiece 22. A unitized motor assembly 24 is arrangeable in opening 14 of body 12 for rotatably mounting a cutter 26 which makes an engraving in workpiece 22 in accordance with the Figure of template 18 in which tracing assembly 16 is engaged.

Tracing assembly 16 includes a tracing stylus arm 28 fastened to body 12 as a suitable threaded fastener (not shown), and further includes a tracing stylus pin 30 vertically adjustably arranged at the outermost, or free, end of the cantilever mounted arm 28 for engaging in a suitable letter template such as template 18. In addition to having engraved letters, numbers, and the like, on its surface, template 18 is also provided with a longitudinally extending guide track 32 recessed into the surface of the template. A track pin 34, which is suitably threaded, and the like, for vertical adjustment rides in the slot forming guide track 32, and becomes a pivotal point moving around the longitudinal axis of the template 18. With tracing stylus pin 30 engaged in a recessed letter, and the like, such as letter 36, cutter 26 will faithfully trace a path as confined by the pivot point about the track pin 34 and the stylus pin 30. The depth of cut, once preset by engaging the cutter 26 through the center of a mandrel forming part of motor assembly 24, is controlled by a threaded thumb wheel 38 and its associated shoe 40. The latter rides along the workpiece 22, as is clearly shown in FIGS. 2 and 3, with thumb wheel 38, shoe 40, and a threaded rod 42 connecting together the thumb wheel and shoe, forming assembly 20. The depth of cut 68, as shown in FIGS. 2 and 3 of the drawings, will therefore be determined by the adjustable character of thumb wheel 38.

To insure a true vertical cut, all engraving points of stylus pin 30, track pin 34, cutter 26, and the height adjustment thumb wheel 38 and its respective shoe 40, are preset such that body 12 is parallel to the surface of workpiece 22. Then only a minor deviation from the true vertical axis will be encountered as the depth of cut is varied by the height adjustment thumb wheel 38. It will be appreciated that the latter is affixed to threaded rod 42 such that the threaded rod will be threadedly advanced in a threaded bore (not shown in detail) provided in body 12 when thumb wheel 38 is rotated.

Referring now to FIGS. 2–4 of the drawings, the motor assembly 24 includes a combination of a fluid motor and a spindle 44. More specifically, the fluid motor includes a motor cap 46 and a bearing 48 arranged in a recess as provided in the underside of cap 46. Both cap 46 and bearing 48 are affixed to the longitudinally extending, reduced diameter portion of spindle 44 for rotation therewith. A fluted rotor 50 is affixed to the same portion of spindle 44 for rotating same, while a bearing 52 is also affixed to the reduced diameter portion of spindle 44. Bearings 48 and 52 are arranged bracketing rotor 50.

A cavity 54 is provided in body 12 and is arranged in communication with opening 14 of body 12 for forming a chamber receiving rotor 50. A tube 56 enters body 12 and terminates at an interface between rotor 50 and the chamber receiving the rotor. This tube 56 provides a passage for injecting a fluid under pressure and impinging same on a fluted circumferences 58 of rotor 50. The motor and spindle combination is mounted in opening 14 of body 12 by a press fit of bearings 48 and 52 in the portions of opening 14 which brackets cavity 54. The intention and advantage of this arrangement is to make removal and replacement of the rotor assembly simple and economical for obvious reasons.

Body 12 includes a removable cover 60 in the form of a plate having a boss arranged adjacent the associated portion of opening 14 formed in the cover. Bearing 48, associated with motor cap 46, is press fit into the part of opening 14 provided in cover 60.

In operation, tube 56 is connected to a suitable source of compressed air or other suitable fluid so as to inject the air, and the like, through tube 56, and cause the gas to impinge upon fluted circumference 58 of rotor 50. The fluid passes at a high velocity about and along the circumference of rotor 50, driving the rotor in, for example, a clock-wise rotation as viewed in FIG. 2. The rotor cavity 54 confines the fluid flow about circumference 58 of rotor 50 in a predetermined manner causing angular excursion of approximately, for example, 45°. The flow then becomes an archimedean spiral outward so as to gradually give vent to the compressed high velocity fluid into an open annulus arranged just anterior to a porous substance 62 shown in FIGS. 2 and 3. The now low velocity fluid passes along partition 65 through the porous substance 62 which fills the labyrinth formed in the interior of body 12 along partition 65 to the edge 67 thereof (FIG. 2) and then passes to a point just anterior of an exhaust port located approximately at 64 (FIG. 4).

The labyrinth filled with the porous substance 62 which may be foam rubber, and the like, together with the reverse-bend of fluid flow caused by the partition 65, serves to muffle the sound of the high velocity fluid, and further provides a back pressure of determinable strength to fulfill another requirement of the machine. That is, the fluids introduced into the machine carry minute droplets of oil, and the like, aspirated into the fluid from a conventional commercial oiler (not shown) arranged upstream from the inlet to tube 56. These oil droplets now impinge upon rotor 50, which is rotating at speeds in excess of 20,000 rpm, and are further reduced to molecular proportions within the cavity 54. A slight differential pressure above atmospheric is maintained during operation of tool 10. The pressure within cavity 54 now forces an isometric amount of oil carrying fluid through bearings 48 and 52, thereby cooling and lubricating the bearings constantly. This arrangement makes it possible to maintain extremely high rotational speeds of motor assembly 24 for extended periods.

As can be readily seen from FIG. 3 of the drawings, motor cap 46 is provided with an aperture 66 dimensioned for providing sufficient clearance to vent gas passing through bearing 48.

As will be appreciated from the above description and from the drawings, a fluid actuated, portable engraving tool 10 according to the present invention incorporates a modular or unitized turbine motor that may be readily tested, balanced, and installed within cavity 54 of body 12. Contributing to this simplified installation, testing, and balancing procedure is the capability of motor assembly 24 to be removed complete with motor cap 46, but not cover 60. That is, the entire motor assembly 24 is installable and removable as a separate unit. In this manner, a tool according to the present invention is capable of obtaining speeds of 40,000 to 60,000 rpm in a predictable manner at pressures less than 20 psig.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fluid actuated, portable engraving tool, comprising, in combination:
   a. a body provided with an opening;
   b. a tracing assembly mounted on the body and arranged for engaging in a suitable template; and
   c. a unitized fluid motor assembly arrangeable in the opening of the body, said motor assembly including, a spindle, an engraving means attached to said spindle, a motor cap, a bearing affixed onto the spindle for rotation therewith and received in a recess provided in the motor cap, a fluted rotor affixed to the spindle, and a further bearing affixed to the spindle and arranged bracketing the rotor in cooperation with the bearing, a cavity provided in the body and arranged in communication with the opening of the body for forming a chamber receiving the rotor, a tube entering the body and terminating at an interface between the rotor and the chamber receiving the rotor, the tube providing a passage for injecting a fluid under pressure and impinging same on a fluted circumference of the rotor, and the body member is further provided with a labyrinth, a short partition dividing the labyrinth so as to cause a reversebend of the exhaust fluid flow, and a foamed material arranged in the labyrinth for exerting a back pressure on the fluid under pressure and forcing a lubricant carried in the fluid under pressure to be forced into the bearing and further bearing.

2. A structure as defined in claim 1, wherein the motor and spindle combination is mounted in the opening of the body by a press fit of the bearings.

3. A structure as defined in claim 2, wherein the body includes a removable cover, part of the opening of the body being formed in the cover, the bearing associated with the motor cap being press fit into the part of the opening provided in the cover.

* * * * *